J. L. KELLOGG.
KINDERGARTEN APPARATUS.
APPLICATION FILED OCT. 30, 1920.

1,385,623.

Patented July 26, 1921.
2 SHEETS—SHEET 1.

INVENTOR
JAMES L. KELLOGG
BY
ATTORNEY

J. L. KELLOGG.
KINDERGARTEN APPARATUS.
APPLICATION FILED OCT. 30, 1920.
1,385,623.
Patented July 26, 1921.
2 SHEETS—SHEET 2.
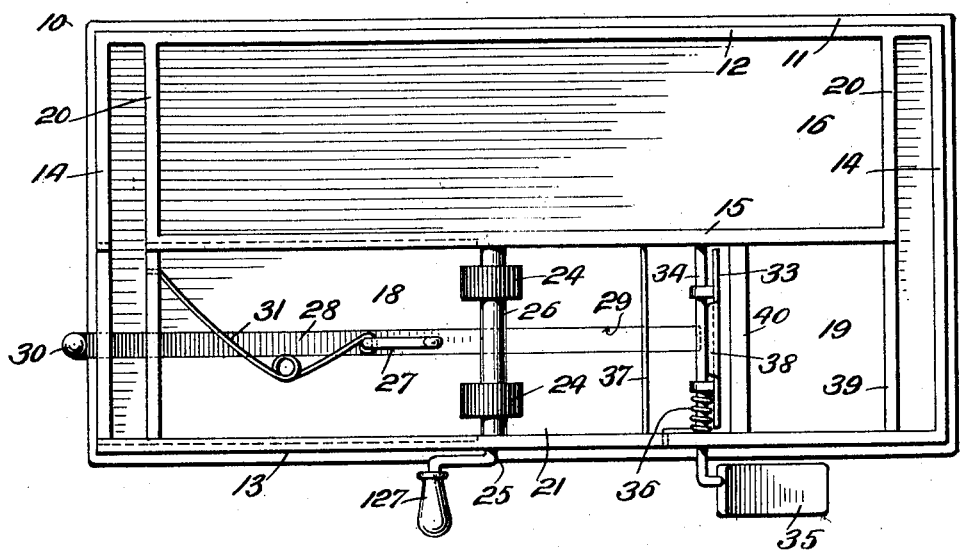
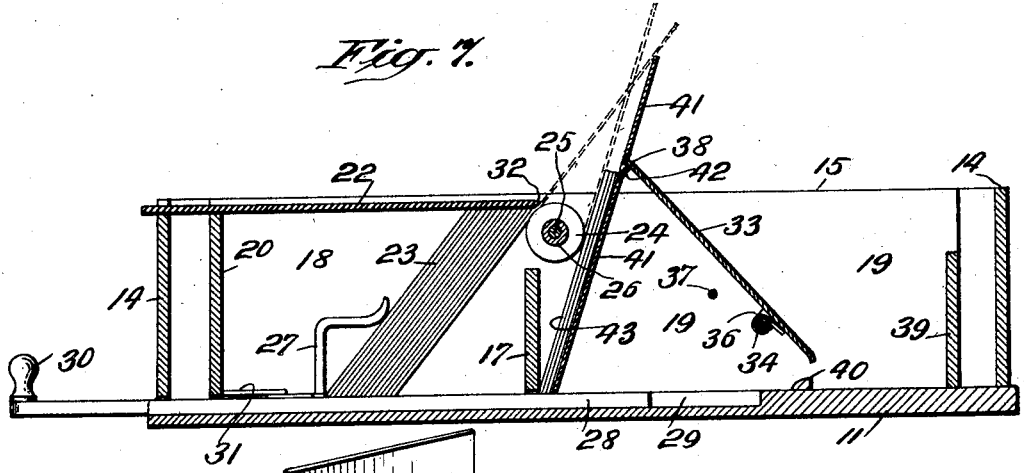
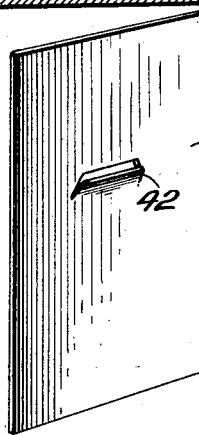
INVENTOR
JAMES L. KELLOGG
BY
ATTORNEY

UNITED STATES PATENT OFFICE.

JAMES L. KELLOGG, OF NEW YORK, N. Y.

KINDERGARTEN APPARATUS.

1,385,623.  Specification of Letters Patent.  Patented July 26, 1921.

Application filed October 30, 1920. Serial No. 420,622.

*To all whom it may concern:*

Be it known that I, JAMES L. KELLOGG, a citizen of the United States, and a resident of New York city, in the county of New York and State of New York, have invented certain new and useful Improvements in Kindergarten Apparatus, of which the following is a specification.

The invention pertains more particularly to educational apparatus for use in teaching children, the apparatus serving to both teach and entertain children, and embodying various movable object cards, with the use of which children may be taught the meaning of words, spelling, arithmetic and the like. One purpose of the invention is to employ object cards having on one side thereof a word or expression and on the other side thereof a picture illustrative of such word or expression and to so display these cards, with the use of my apparatus, that the obverse face of a card bearing, for illustration, the word "House," may be exposed to view and then the reverse face of the same card bearing a picture of a house may be brought to exposure position, so that a child may not only see the word "House" but may be impressed with the meaning of the word by the display immediately thereafter of a picture of a house. The apparatus of my invention is designed to hold a stack of cards and to successively display the obverse face of each card and then its reverse face, the cards being moved in succession to an elevated position to expose the obverse faces thereof and then turned over into another compartment of the apparatus with the reverse face of the card exposed. The object cards may bear numerals as, for instance, a card may bear on its obverse face the characters "4×10," and on its reverse face the number "40," this serving to impress a child in the teaching of the multiplication table. Addition and subtraction and other subjects may likewise be taught with the employment of the object cards. The apparatus of my invention is designed to facilitate the proper manipulation of the cards for the instruction and entertainment of a child, and said apparatus will preferably be of box form having one long side-compartment to hold the reserve stock of cards and another side compartment subdivided by a partition into a front compartment and a rear compartment, the front compartment being intended to hold a stack of the cards for immediate use and successive display as to their obverse faces and the rear compartment being provided to receive the successive cards after their obverse faces have been exposed and to successively expose the reverse faces of the cards. My apparatus embraces means for successively feeding the cards upwardly from the back of the stack in the front compartment of the box and means in the rear compartment of the box to receive the successive cards and turn their obverse faces to the back so that their reverse faces may face frontwardly for observation. In another form of my invention I successively expose the obverse faces of the cards and deliver them to the rear compartment of the box without exposing their reverse faces. The apparatus of my invention is a self-contained portable structure easily handled and operated and has been designed with the view of convenient use in a school room or like place.

The invention will be fully understood from the detailed description hereinafter presented, reference being had to the accompanying drawings, in which:

Figure 1 is a vertical longitudinal section, taken on the dotted line 1—1 of Fig. 2, of a kindergarten apparatus constructed in accordance with and embodying my invention, a number of the educational cards being illustrated in the front compartment of the apparatus for successive exposure and transfer to the rear compartment of the same, in which a number of the transferred cards are indicated, and one of the cards belonging to the front compartment being shown by dotted lines as having been moved upwardly to exposure position preparatory to being transferred to the rear compartment;

Figure 1:
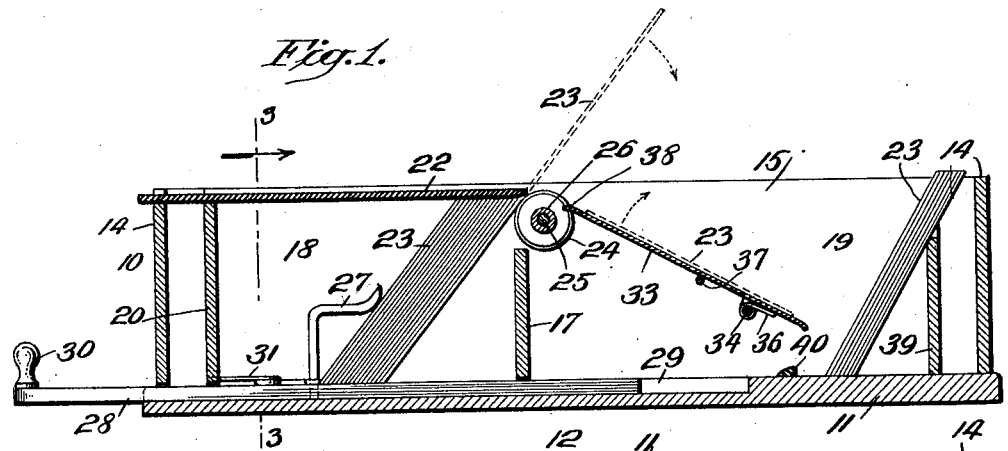
Figure 2:
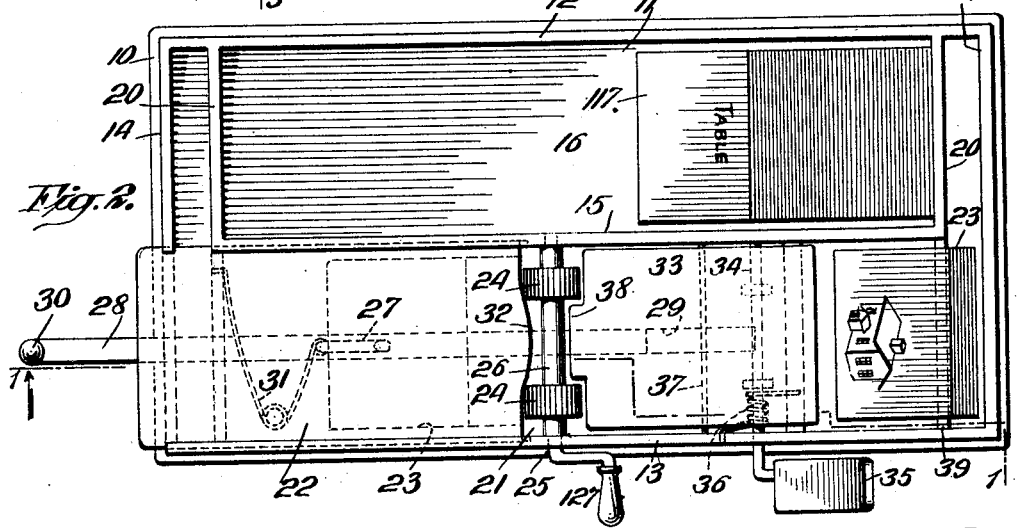
Fig. 2 is a top view of the same.

Fig. 6 is a top view of the apparatus with the cover for the front compartment omitted and the tiltable card transferring plate shown as turned upwardly from the position in which said plate is illustrated in Fig. 1, this upward movement of said plate being for the purpose of transferring a card indicated on the plate by dotted lines in Fig. 1, to a standing position in the back portion of the rear compartment of the apparatus;

Fig. 7 is a vertical section through the apparatus, taken on the dotted line 1—1 of Fig. 2, but illustrating a modified construction of a portion thereof and indicating a method of so handling the cards elevated from the front compartment that only the obverse faces of the cards are exposed to the pupil, and Fig. 8 is a detached perspective view of a plate I apply to the apparatus shown in Fig. 1 and which is illustrated in Fig. 7 for carrying out the method of use indicated in Fig. 7, whereby during the transfer of the cards from the front compartment to the rear compartment of the apparatus, only the obverse faces of the cards are exposed to view.

In the drawings, 10 designates a suitable box or cabinet which I utilize to hold the cards and mechanism comprised in my invention, said box 10 being of convenient outline and having a bottom 11, sides 12, 13, ends 14 and a longitudinal partition 15 which subdivides the box into a side compartment 16 for holding the reserve stock of cards 117 and a corresponding side compartment 21 which, by means of a partition 17, is subdivided into a front compartment 18 and a rear compartment 19. The box may also have transverse partitions 20 adjacent to its ends 14 so as to form smaller compartments adapted to receive such cards as an instructor using the apparatus may desire to temporarily place therein. The compartment 16 is intended to hold as many of the reserve cards 117 of different characters as it may be desired to place therein. The mechanism for handling or manipulating the cards is disposed more especially within the compartment 21 which lies parallel with the compartment 16 and, by means of the partition 17, is subdivided as aforesaid, into the compartments 18, 19. The front compartment 18 will preferably have a removable cover 22 of slide-type, and within said compartment 18 and below the cover 22 will be placed a stack or bundle of the object cards intended for immediate use, these cards being indicated, at 23, in position for use. The upper ends of the cards in the stack 23 will be immediately below the cover 22 and said cards will stand on an incline, their lower ends resting on the bottom 11 of the box, while the upper rear side of the stack bears against feed rollers 24, which preferably will be of rubber or rubber-coated and mounted upon a transverse shaft 25 having its bearings in the partition 15 and side 13. The rollers 24 may be in one piece with a tubular sleeve 26 adapted to be slipped upon the shaft 25, and said shaft 25 adjacent to one side of the box is provided with a crank or operating handle 127 by which the shaft and rollers 24 may be rotated to feed the successive cards in the stack 23 upwardly from the compartment 18 and to the position in which a card is indicated by the dotted lines in Fig. 1, in which position the obverse face of the card will be exposed frontwardly for visual observation. The stack of cards 23 will be pressed against, at the front thereof, by a follower 27 which, in the present instance, is in the form of an angular rod extending upwardly from a slide bar 28 and having an upper rearwardly directed arm whose rear end is rounded and engages the stack 23 at a suitable elevation above the lower edge thereof. The bar 28 is mounted within a longitudinal groove 29 formed in the upper surface of the bottom 11 of the box, and said bar has an exposed handle 30 by which it may be drawn outwardly to facilitate the application, upon the retraction of the cover 22, of the stack of cards 23 into the compartment 18. Within the compartment 18 I provide a wire spring 31 which is flexed against the follower 27 and serves to keep said follower pressing against the front of the stack of cards 23, said follower moving rearwardly with the stack 23 as the cards are successively moved upwardly from the rear or back of the said stack. The rear edge of the cover 22 for the compartment 18 curves rearwardly, as at 32, between the feed rollers 24 to form a tongue which serves as a means for keeping the cards, as fed upwardly, pressed against said rollers and assists said rollers in holding the cards, as successively exposed, in their elevated position, until such time as the instructor may desire the cards delivered into the compartment 19. The cards of the stack 23 will be successively elevated from the back of the stack to the position illustrated by dotted lines in Fig. 1 by the rotation of the rollers 24 actuated by the crank handle 27, and the operator may move said cards 23 upwardly as rapidly or as slowly as may be required, and as each card reaches its upper or exposure position, the card may be permitted to remain in that position as long as the instructor may deem necessary by his omission to operate the handle 127. When it is desired to dispose of a card which has remained in its elevated position a suitable length of time, the crank handle 127 will be again operated in the same direction to feed the card entirely from the compartment 18 and cover 22 and to cause said card to fall or tilt rearwardly over the top of the rollers 24 and into the compartment 19, as indicated by the upper arrow in Fig. 1. Within the compartment 19 I provide a tiltable plate or table 33 to receive the cards as they, in succession, fall rearwardly over the rollers 24, and one of said cards 23 is indicated by dotted lines as having fallen upon the plate or table 33. The plate 33 is secured on a transverse rod 34 which has its bearings in the partition 15 and side 13 and is provided at one end with an exposed finger-piece or handle 35. Upon the rod 34 is coiled a spring 36, one end of which engages the plate 33 and the other the side 13 of the box 10 and the function of this spring is to yieldingly hold the plate 33 in its initial inclined position shown in Fig. 1, and to restore said plate to said position after the plate has been turned rearwardly by means of the finger piece 35. The spring 36 is therefore under a tension acting to turn the plate 33 forwardly, a stop-rod 37 being provided to support the plate 33 when in its forward position shown in Fig. 1. The upper edge of the plate 33 is normally adjacent to the rollers 24 and said plate has a forwardly projecting portion 38 which extends inwardly between the rear portions of the rollers 24, as shown in Fig. 2. The plate 33 normally inclines downwardly and rearwardly, as shown in Fig. 1, and whenever a card 23 falls over the rollers 24 and upon said plate, the operator may, by pressing downwardly on the finger piece 35 turn said plate rearwardly so as to throw the card therefrom into an inclined position against the upper edge of a partition or rest 39 located adjacent to the rear end of the compartment 19 or to the position in which I illustrate a series or stack of the cards 23 in said compartment. The partition 39 may form a continuation of the partition 20, but will be less in height than the body of said partition 20. As soon as the plate 33 has been operated to transfer one of the cards 23 to the partition 39, the pressure will be released from the finger piece 35 so as to permit the spring 36 to immediately restore the plate 33 to its initial position ready to receive another card fed from the front compartment 18. It is to be observed that one face of the card 23 is exposed to view when said card is in its elevated position, shown by dotted lines in Fig. 1, and that the other face of the same card is exposed to view after the table 33 has delivered the card into the rear end of the compartment 19, and this illustrates one of the objects of my invention, to-wit: to have a name or the like on the obverse face of the card when first exposed and a picture on the reverse face of the card defining or illustrating the word and exposed when the card is delivered into the rear compartment 19. If the card shown by dotted lines in Fig. 1 should have on its obverse face the word "House," the picture on the reverse face of the same card would be that of a house and would be exposed when the card arrives into the compartment 19, as I illustrate in Fig. 2. The cards 23 are successively, by means of the rollers 24, under the guidance of the instructor, moved to exposure position and then caused to fall on the plate 33 by means of which said cards are delivered and stacked into the rear end of the compartment 19 and at the same time turned over so that therein their reverse faces are exposed, whereas the front faces of the cards were exposed when said cards were in their elevated position above the rollers 24. I provide on the bottom of the compartment 19 a stop bar 40 which will serve to prevent the cards when at the rear end of the compartment 19 from sliding forwardly at their lower edges.

Figure 3:
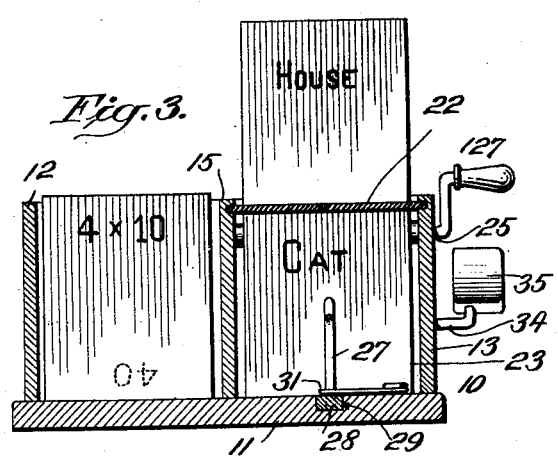
Fig. 3 is a vertical transverse section though the same, taken on the dotted line 3—3 of Fig. 1.

The operative portions of the apparatus of my invention only comprise a few inexpensive and easily mounted and operated parts, and these parts are not liable to become deranged or injured in use, and the apparatus as a whole is portable, being all associated with the box 10, which may be handled as a unit. I illustrate both sides of one object card in Figs. 4 and 5, the word "Fly" being on the obverse face of the card and the picture of a fly on the reverse face thereof. The various cards in the stack or reserve stock stored in the compartment 16 will differ from one another in the words and pictures that may be thereon, the cards shown in the drawings being illustrative only. A card may have the word "Dog" on its obverse face and a picture of a dog on its reverse face, and a child shown the word "Dog" and the picture of the dog would be impressed as to what the word actually spelled. I may use the object cards in the study of arithmetic, and hence at the left hand side of Fig. 3 I illustrate on the obverse face of one card the characters "4×10", while on the reverse face of the same card I have the number "40", the number "40" impressing the child with the fact that 4×10 equal 40. I contemplate the study of various subjects with the use of the object cards and the apparatus hereinbefore described, as will be readily understood, but as a further illustration I may say that I may place a phonetic or stenographic character on the obverse face of a card and have the word or expression indicated thereby printed on the reverse face of the same card, thus serving to impress a student with the phonetic sign and the correct meaning thereof.

I also contemplate the use of my apparatus in carrying on more or less rapid addition, the obverse faces of say a series of cards bearing numbers to be added together as the cards are successively exposed at the rollers 24, and to be followed by a final card of the set which will give the total amount of the addition for the series of preceding cards. The student will mentally add the numbers appearing on the series of cards and his result must tally with the result announced on the final one of the series or the card following such series when it becomes exposed above the feed rollers 24. In this utilization of my invention I apply within the rear compartment 19 an inclined board or plate 41, as shown in Fig. 7, this board 41 being inclined downwardly and forwardly between the upper end of the plate 33 and the lower rear edge of the partition 17, and preferably having a lip 42 downwardly against which the upper end of the plate 33 may press for holding the plate 41 firmly in position. When I make use of the plate 41, the cards fed upwardly from the compartment 18 by means of the rollers 24 will tilt at their upper portions against the upper edge of the plate 41 and the lower edges of the cards will ride over the rollers 24 and descend downwardly at the back of said rollers and between the same and the plate 41, as I illustrate at 43 in Fig. 7. The rotation of the rollers 24 may be carried on rapidly so that a series of the cards from the compartment 18 may be quickly exposed and then caused to descend to concealing position, only the matter on the obverse faces of the cards being exposed. If a series of five cards were to be exposed, each bearing a number and all of the numbers to be added together, these five cards would in succession be moved upwardly and then downwardly at the back of the rollers 24 and then the following card elevated should bear a number giving the total addition of the five preceding cards, this last card confirming or disproving the mental addition of the student during the movement of the five preceding cards. In the form of the apparatus shown in Fig. 7 I may teach addition or mental arithmetic, and obviously the characters to be placed on the cards will vary with the results I seek to attain, it being entirely convenient to teach other branches of arithmetic with the use of the cards as arranged in Fig. 7 as well as addition.

I have designed the apparatus as a whole as one convenient for a teacher to handle and one which will prove to be both entertaining and instructive to a child, and the illustrations I have given indicate only some of the uses to which the apparatus may be put.

Figure 4:
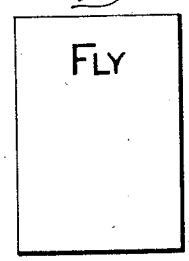
Fig. 4 is a face view of the obverse side of one of the cards employed in my apparatus.
Figure 5:
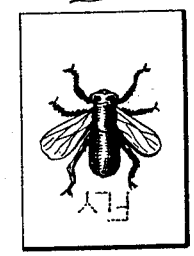
Fig. 5 is a like view of the reverse side of the same card.

It is desirable that the pack of cards be placed in an upwardly and rearwardly inclined position in the compartment 18 and against the feed rollers 24, since thereby the successive cards become fed upwardly to exposure position at an inclination and on a renewal of the rotation of the rollers, tilt rearwardly at their upper ends toward the compartment 19. The rear edge of the cover 22 is at the front of the upper portion of the rollers 24 and coöperates therewith in holding the cards in their inclined exposure position. I prefer to use two rollers 24, but with less saving of material I may use one long roller instead of two narrow rollers. The apparatus may, also, be varied in other details without departure from my invention as claimed. I may add, also, that since both sides of the cards intended for reversal bear relative subject matter, as shown in Figs. 4 and 5, either face thereof may be regarded as the obverse face, in accordance with the views of the instructor.

A desirable feature of the apparatus of my invention resides in the fact that the cards successively exposed at the rollers 24 and transferred thereby to the compartment 19 become stacked in regular order in said compartment and may be lifted therefrom in well arranged stacks or bundles, the handling of and wear on the cards being thus reduced to a minimum.

What I claim as my invention and desire to secure by Letters Patent, is:

1. Apparatus of the character described comprising a box affording front and rear chambers or compartments, a plurality of independent object cards for successive display to be stacked in said front compartment, manually operative means engaging the back of the stack for feeding the successive cards upwardly to exposure position, means pressing the stack against said feeding means, and means at the back of said feeding means to receive the successive cards exposed at the front thereof and passing over the same and serving as means to stack the cards in said rear compartment.

2. Apparatus of the character described comprising a box affording front and rear chambers or compartments, a plurality of independent object cards for successive display to be stacked in said front compartment, a feed roller against which the back of the stack is placed, manually operative means for rotating said roller to feed the successive cards upwardly to exposure position, a spring actuated follower pressing the stack against said roller, and means at the back of said roller to receive the successive cards exposed at the front thereof and passing over the same and serving as means to stack the cards in said rear compartment.

3. Apparatus of the character described comprising a box affording front and rear chambers or compartments, a plurality of independent object cards for successive display to be stacked in said front compartment in an upwardly and rearwardly inclined position, a feed roller against which the upper rear portion of the stack is supported, a follower for pressing the stack against said roller, manually operative means for rotating said roller to feed the successive cards upwardly to exposure position, and means at the front of said roller to engage the successive cards as moved upwardly and coöperate with the roller in holding the same in exposure position and inclined upwardly and rearwardly, the exposed cards on the renewed rotation of said roller being freed and passed to said rear compartment.

4. Apparatus of the character described comprising a box affording front and rear chambers or compartments, a plurality of independent object cards for successive display to be stacked in said front compartment in an upwardly and rearwardly inclined position, feed rollers against which the upper rear portion of the stack is supported, a follower for pressing the stack against said rollers, manually operative means for rotating said rollers to feed the successive cards upwardly to exposure position and a cover above said stack and having a tongue entered between said rollers to engage the successive cards as moved upwardly, said cover coöperating with said rollers in holding the cards in an upwardly and rearwardly inclined exposure position, and the cards after being exposed being by the renewed rotation of the rollers freed and automatically passed to said rear compartment.

5. Apparatus of the character described comprising a box affording front and rear chambers or compartments, a plurality of independent object cards for successive display to be stacked in said front compartment, a feed roller against which the back of the stack is placed, manually operative means for rotating said roller to feed the successive cards upwardly to exposure position, a spring actuated follower pressing the stack against said roller, a tiltable table on which the cards as successively exposed fall from over said roller, and manually operative means for turning said table rearwardly to stack the cards in said rear compartment with their reverse sides facing frontwardly, whereby first one face and then the other face of each card becomes exposed, both sides of the cards bearing relative subject matter.

6. Apparatus of the character described comprising a box affording front and rear chambers or compartments, a plurality of independent object cards for successive display to be stacked in said front compartment, a feed roller against which the back of the stack is placed, manually operative means for rotating said roller to feed the successive cards upwardly to exposure position, a spring actuated follower pressing the stack against said roller, a tiltable table on which the cards as successively exposed fall from over said roller, and manually operative means for turning said table rearwardly to stack the cards in said rear compartment with their reverse sides facing frontwardly, whereby first one face and then the other face of each card becomes exposed, both sides of the cards bearing relative subject matter, said table initially inclining downwardly and rearwardly from said roller and having means for automatically returning it to that position after it has been turned rearwardly to deposit a card which fell upon it.

7. Apparatus of the character described comprising a box affording front and rear chambers or compartments, a plurality of independent object cards for successive display to be stacked in said front compartment, a feed roller against which the back of the stack is placed, manually operative means for rotating said roller to feed the successive cards upwardly to exposure position, a spring actuated follower pressing the stack against said roller, and manually operative means at the back of the roller to receive therefrom the cards as successively exposed and successively deposit said cards with their reverse sides facing forwardly to expose the subject matter thereon.

8. Apparatus of the character described comprising a box affording front and rear chambers or compartments, a plurality of independent object cards for successive display to be stacked in said front compartment, a feed roller against which the back of the stack is placed, manually operative means for rotating said roller to feed the successive cards upwardly to exposure position, a spring actuated follower pressing the stack against said roller, and manually operative means at the back of the roller to receive therefrom the cards as successively exposed at their obverse face and effect the exposure of the reverse face of the cards, whereby first one face and then the other face of each card becomes exposed, and said cards having on both faces relative subject matter.

Signed at New York city, in the county of New York and State of New York, this 28th day of October, A. D. 1920.

JAMES L. KELLOGG.